United States Patent

Cole et al.

[11] 3,942,922
[45] Mar. 9, 1976

[54] TIRE PRESS AND MOLD LEAKAGE CONTROL

[75] Inventors: Clarence R. Cole, Medina; Robert L. Duncan, Akron, both of Ohio

[73] Assignee: The Goodyear Tire & Rubber Company, Akron, Ohio

[22] Filed: Apr. 1, 1974

[21] Appl. No.: 457,029

[52] U.S. Cl. .................. 425/30; 425/29; 425/32
[51] Int. Cl.² .......................................... B29H 5/02
[58] Field of Search .......... 425/29, 30, 32, 109, 33, 425/36, 22, 23; 324/181

[56] References Cited
UNITED STATES PATENTS

| | | | |
|---|---|---|---|
| 2,015,855 | 10/1935 | Kerr | 425/29 |
| 2,204,531 | 6/1940 | Erbguth et al. | 425/29 |
| 2,392,619 | 1/1946 | Soderquist | 425/169 X |
| 3,029,469 | 4/1962 | Moore et al. | 425/33 |
| 3,167,810 | 2/1965 | Soderquist | 425/32 |
| 3,222,715 | 12/1965 | Harris | 425/32 |
| 3,321,704 | 9/1967 | Mann | 324/181 |
| 3,329,748 | 7/1967 | Hugger | 425/29 X |

*Primary Examiner*—J. Howard Flint, Jr.
*Attorney, Agent, or Firm*—F. W. Brunner; R. S. Washburn

[57] ABSTRACT

Apparatus for curing a tire having an internal cavity using as heat and fluid pressure media first steam and then cooler inert gas. The time rate of pressure loss in the cavity is determined in each tire curing cycle by closing the cavity so as to form a completely closed chamber for a test time less than the normal cure time for the tire. Pressure loss during the test time is monitored and if determined to be at a greater than tolerable rate a warning device is actuated and means for loading a next tire into the mold is rendered inactive.

6 Claims, 3 Drawing Figures

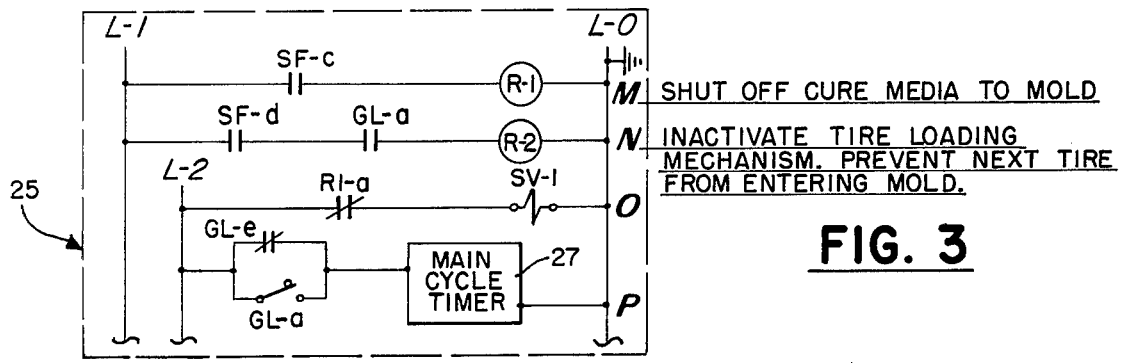
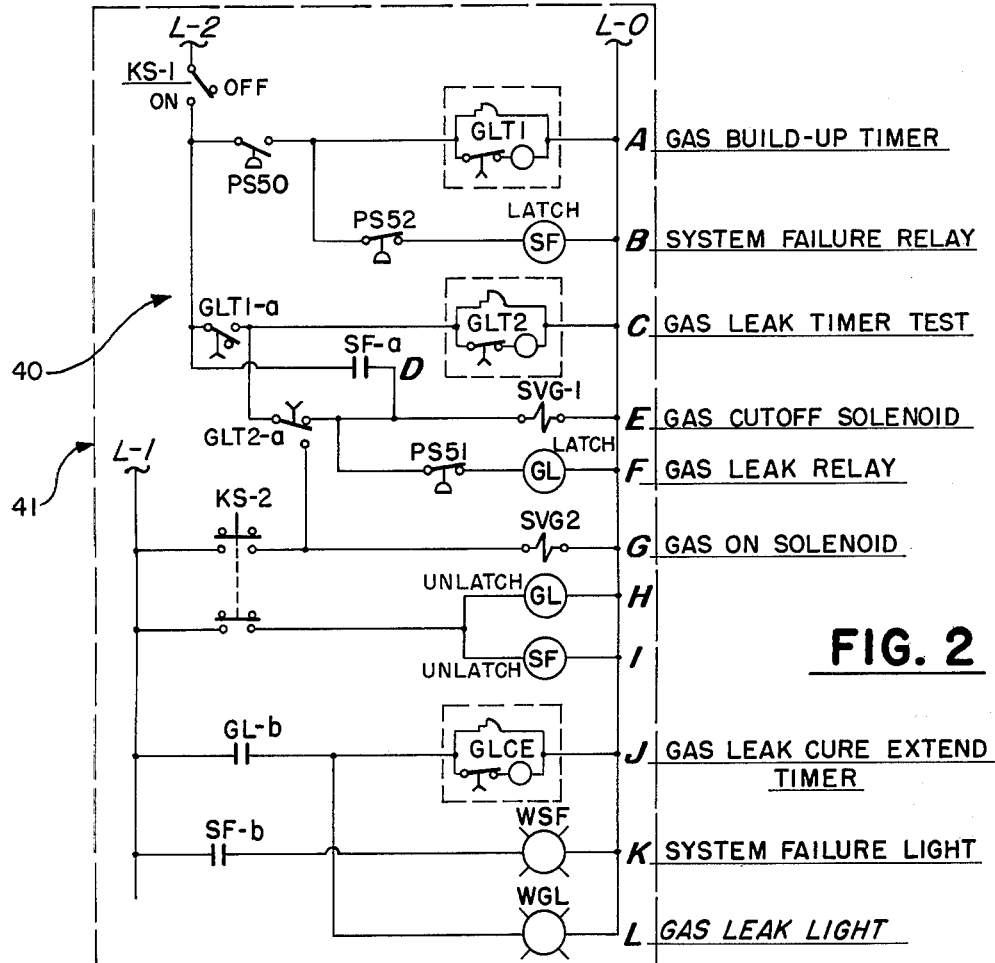
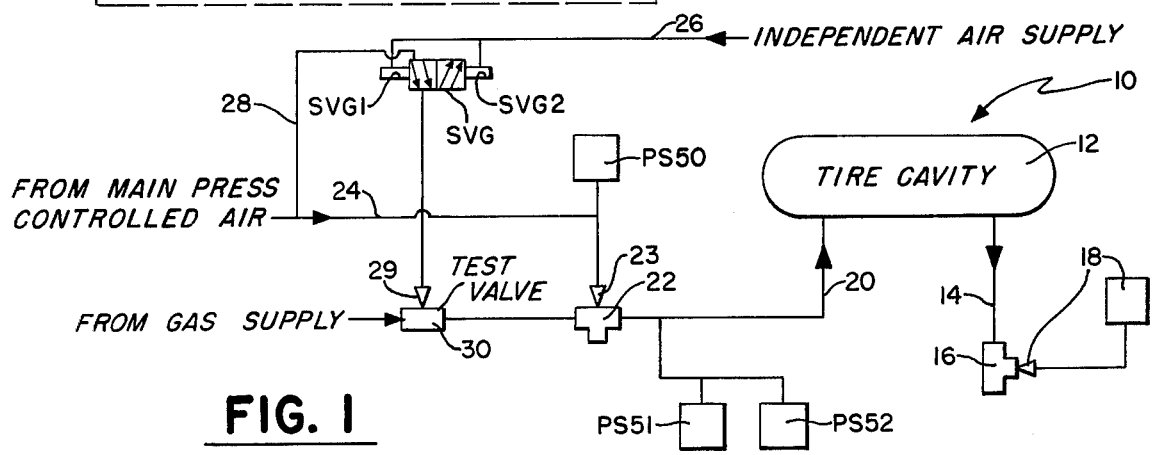

TIRE PRESS AND MOLD LEAKAGE CONTROL

The foregoing abstract is not to be taken as limiting the invention of this application, and in order to understand the full nature and extent of the technical disclosure of this application, reference must be made to the accompanying drawing and the following detailed description.

The present invention relates to molding and curing tires and particularly to controlling leakage by detecting loss of pressure in the cavity of the tire which loss can harmfully affect the quality of a tire being cured.

The object of the invention is an improved apparatus for carrying out the method, for detecting leakage of fluid pressure from the interior cavity of the tire while the tire is being molded and cured in a tire mold. Other objects and advantages will be made apparent in the description and in the appended drawings of a preferred embodiment of the invention.

In the appended drawings:

FIG. 1 is a schematic representation of curing fluid media service system according to the invention; and FIGS. 2 and 3 are schematic diagrams of control circuit arrangements cooperable with the system of FIG. 1 in accordance with the invention.

In the conventional practice of curing tires using steam and/or hot water within the tire cavity both to supply heat necessary for curing and pressure necessary for molding of the tire in the mold, a reasonable amount of leakage of the fluid medium can be and is tolerated because such leakage of the fluid medium does not harmfully affect the quality of the tire. With steam and/or hot water, such losses of fluid media are continually replaced from the supply thereof without affecting the pressure or the temperature within the cavity.

In past years many proposals and attempts to use fluid media other than steam and/or hot water have been made. Insofar as we are aware, none of the proposals or attempts have been of sufficient merit to be suitable for continued commercial use. More recently, renewed attempts at using inert gas in combination with steam and/or hot water for molding and curing tires have been developed and found suitable for commercial use. While the present invention is not limited to use in a particular combination of steam and/or hot water, and/or inert gas, as fluid media, it finds particular utility in such combination of fluid media which includes an inert gas.

According to the invention, the pressure of the fluid medium in the tire cavity is continuously monitored. In the event that the pressure within the cavity falls below a predetermined pressure level or fails to attain such a pressure level because of massive leakage, termed herein "system failure," admission of heating and/or pressure media is thereupon cut off and mechanism is actuated to prevent the insertion into the tire mold of a next tire to be cured.

Although it has been common practice in the art heretofore to record continuously the pressures existing in the cavity on strip or circular-chart recorders, we have found that in use of now conventional automatic press system control, certain leaks at rates less than the massive leaks herein called system failure in the tire molding and curing press system may result in undercured tires being delivered out of the curing press. In normal operation, such lesser leaks are not always promptly noted by even careful press operating personnel.

By application of the present invention, failures in the press system of the system failure type due, for example, to the accidental blockage in an open position of drain or discharge valves, or to a ruptured curing bladder, as well as lesser leakage even at heretofore undetected rates, are promptly detected and can be corrected before loading the next tire into the press.

In another aspect, the invention provides for the positive detection of pressure loss in excess of a tolerable rate from within the cavity of a tire being cured. According to this aspect of the invention the pressure in the tire cavity is continuously monitored as before; however, during a latter part or fraction of the predetermined curing cycle the admission of the pressure medium is cut off for a preset time. By way of example in the curing cycle for a common size passenger vehicle tire, the total curing cycle during a first part of which steam at 155–200 psig. is admitted, is for example, for about 1½ to 2 minutes. Then, in a second, later, part of the cycle, an inert gas at about 300–400 psig. is admitted for from 7 to 11 minutes. According to the method, a leakage test is performed once during the cure cycle of each tire cured in the press. Preferably, the test is effected during the latter part of the inert gas phase of the cycle. Admission of the inert gas pressure medium to the tire cavity is cut off, for example, for 3 minutes from the 8th minute to the 11th minute, during which time the tire cavity and the passages connected thereto are completely closed off from communication either to the supply of the inert gas or to the drain and form, with the cavity, a completely closed chamber. If the pressure within such chamber decreases from the initial molding-curing pressure to a predetermined lower pressure, the decrease will be in part attributable to leakage somewhere from the chamber or from the connections to the chamber.

The change in pressure of the medium contained within the cavity and chamber from the prescribed initial pressure level to the preselected lower pressure level divided by the preset time interval, of which the previously mentioned 3 minutes is representative, provide a measure of the rate (that is, the pounds per square inch per minute rate of pressure decrease) of leakage of the fluid medium from the cavity. It is to be noted, however, that a portion of such decrease in pressure will result not from leakage but from condensation of the steam already in the cavity. By performing the test late in the inert gas phase of the curing cycle, the effect of such condensation on the rate of pressure decrease measured is diminished. Heretofore, loss of pressure attributable to fluid media leakage from the tire cavity and press chamber has not been detectable by conventionally available means, unless and until the rate of such leakage exceeded the maximum rate of flow available from the supply into the cavity, since the cavity pressure remained essentially unaffected.

In the practice of the invention, a tolerable rate or rates of loss of pressure are established empirically, with consideration of tire curing time and initial internal pressure required. A representative tolerable rate of leakage of about 15 to 20 psi. per minute can be adjusted upward or downward experimentally.

As has been mentioned, the present invention is particularly adapted to use in tire molding and curing cycles wherein a predetermined amount of heat is supplied into the tire cavity by steam at a predetermined pressure for a predetermined time after which the steam is cut off and an inert gas is admitted to the steam filled cavity to increase the pressure therewithin to a pressure level greater than that of the steam alone. The total pressure is then maintained within the cavity for the remainder of the cycle. The inert gas used is admitted to the cavity at a temperature cooler than the steam and can approximate the temperature of the surrounding environment and thus be much cooler than the steam. If the chamber leaks, the tire cavity is supplied continuously with inert gas cooler than the steam at a rate sufficient to maintain the pressure which approximates the rate of the leakage. This quantity of additional gas tends to cool the steam thereby reducing the quantity of heat available for the desired cure. Again, as a result of the leakage, certain tires may be insufficiently cured when removed from the mold.

Further, in accordance with the invention, it has been discovered that some leakage of steam and/or inert gas at rates less than leakage rates described above can be tolerated since they have no harmful effect on the tires being cured. On the other hand, where leakage rates are found to exceed the rates prescribed, a signal can be provided in response to a decrease in pressure from the normal and prescribed pressure level to the preselected lower pressure level and be employed to prevent the loading of a next tire into the mold.

In accordance with a further aspect of the invention, a signal generated in response to the decrease of pressure to a preset pressure level is used to activate a timer by which the normal control of the press system is interrupted and the predetermined cure time cycle is extended by an experimentally determined time of from two to about ten minutes in accordance with the size and weight of tires being cured. The loss of the steam or of the heat therein prescribed for the particular cure is thus compensated for by increasing the duration of the cure. The additional cure time with the lesser supply of heat available to the tire at that time in the mold can then complete the required amount of cure. The delivery from the mold of insufficiently cured tires can be avoided.

In the apparatus which will be described presently, there are included key locked switches which prevent the restoration of the normal control cycle after leakage has been discovered until the apparatus has been inspected and corrected by authorized personnel, as well as to prevent non-use of the apparatus without authority.

Three modes of operation of the press control are contemplated herein. In the first mode, in which a massive leakage referred to as system failure has occurred, the admission of inert gas is cut off, and not restored until suitable repair is made. Uncured tires awaiting cure are prevented from entering the mold.

In the second mode, in which leakage in excess of an empirically determined tolerable rate, for example, a rate of about 20 psi. per minute as indicated above, and large enough to actuate the preset low pressure detector, but less than considered in the first mode, admission of inert gas is cut off only during the preset time of the test and is then restored and the normal curing cycle time is extended to avoid undercure of the tire then undergoing cure. Uncured tires awaiting cure are, as in the first mode, prevented from entering the mold.

In the third mode, leakage of gas from the cavity is tolerable, that is, less than sufficient to decrease the pressure in the cavity to the predetermined lower pressure during the test time period (at which event a low pressure signal would be generated in the second mode). In this third mode, the preset time of the test runs out, which event provides a positive signal operable to permit continuing the press curing cycle normally, the inert gas can be again admitted to the cavity and the normal cycle is completed without extension of time therefor as in the second mode, and tires awaiting cure are allowed to enter the mold in uninterrupted series.

Turning now to the drawings, FIGS. 1, 2 and 3 are schematic representations of apparatus for carrying out the foregoing methods.

FIG. 1 is a schematic representation of an apparatus and particularly indicates the service system 10 for delivering fluid media to the tire cavity 12 confined in a conventional tire press (not shown). The line 14 represents the passages comprising the drain system by way of which curing media are ultimately discharged from the tire cavity 12. The valve 16 and its operator 18 represent a plurality of such valves and operators for control of the discharge of pressure and curing media from the cavity; such drain line and valves are not within the scope of the present invention and are thus not further described. During operation of the method and of the apparatus being described, such drain and valves are and remain closed.

In the service system 10, inert gas is delivered from a source (not shown) to the tire cavity by way of a fluid medium service line 20 and a conventional inlet control valve 22 which has a valve positioner 23 operated in response to the controlled pressure air supply in the air line 24 governed by the cure cycle control timer of a conventional press master control 25.

The apparatus thus far described is conventional and will be well understood by persons skilled in the art. A tire mold press including the master control, as referred to herein, is available commercially from McNeil Corporation, NRM Corporation, both of Akron, Ohio, and others.

In accordance with the present invention, a further valve operating air supply line 26 is connected to the respective solenoid operated pilot valves SVG-1 and SVG-2 which control the valve SVG and the communication between the operating air pressure line 28 and the positioner 29 of the test valve 30. The test valve 30 is preferably located upstream of the valve 22, that is, between the supply of inert gas and the valve 22, so that the gas pressure leakage test described will test for a loss of pressure by way of the valve 22 as well as otherwise from the tire cavity. The operating air supply line 28 is directly connected to the controlled air supply line 24.

A pressure responsive switch PS-50 is pressure connected to the air pressure supply line 24 for a purpose presently to be described. Pressure responsive switches PS-51 and PS-52 are pressure connected directly to the inert gas inlet line 20 between the tire cavity and the valve 22 to monitor the pressure of the inert gas within the cavity.

A preferred form of gas leak monitoring circuit 40 in accordance with the invention is illustrated in FIGS. 2 and 3. The circuit 40 is preferably housed in a panel 41 apart from the press master control panel 25 to facilitate its addition to existing tire presses. As will be readily apparent, however, the circuit can be readily incorporated in the circuit of the master control panel. In such press master control panel there is commonly provided a master curing cycle timer 27 by which the times of admission and of cutoff of inert gas supply for the press, as well as other events of the cycle are controlled. The circuit 40 is energized by an electrical connection made by the key locked switch KS-1 in the conductor L-2 extending into the main press master control panel 25 and which energizes the main curing cycle timer 27 therein. The line L-2, referring now to FIG. 3, is a circuit so controlled as to be energized only when the press is in automatic mode. (As is known, such main press control circuits are adapted to provide differing functions in each of several modes, for example, a manually controlled mode, a mold change mode or an automatic mode). The gas leak monitoring circuit 40 is thereby energized simultaneously with the timer 27. The neutral line L-0 is connected to the neutral line of the main press control panel.

In response to the timer 27, the solenoid valve SV-1 (line O, FIG. 3) operates to admit pressurized air to the air line 24 to which the normally open pressure switch PS-50 is connected. The pressure switch PS-50 closes in response to the rise in pressure in air line 24, making electrical contact, in line A, FIG. 2 to activate the gas leak test timer GLT-1.

The timer GLT-1 is preset to initiate the gas leak test according to the invention at or after the first half of the inert gas portion of the curing cycle. As was discussed in the example hereinabove, the timer GLT-1 can be preset to time out at the 8minute of an 11 minute inert gas pressure portion of the curing cycle.

In accordance with one aspect of the invention, relating to the prompt warning of a "system failure" type of pressure loss, in line B, FIG. 2, the normally open pressure switch PS-52, closes to actuate, and to latch the system failure relay SF, only upon occurrence of a massive leak, and loss of pressure, from the tire cavity. On being latched, relay contacts SF-a shown in line D are closed thereby actuating the solenoid valve SGV-1 to close the gas test valve 30. The relay contacts SF-b, in line K, are also closed when the relay SF is latched, thereby activating a warning device such as the system failure alarm light WSF. Additional contacts SF-c and SF-d are connected, as shown in FIG. 3. The relay contact SF-c (line M), on being closed by the latching relay SF actuates a relay R-1 operable to shut off all gas flow to the press. The relay contact SF-d, line N, actuates a relay R-2 which is operable to inactivate means for loading a next uncured tire into the mold.

In a further aspect of the invention, at the expiration of the time preset in timer GLT-1, the normally open switch GLT1-a is closed, line C of FIG. 2, to energize the gas leak test timer GLT-2, which can be preset to fix the time duration of the leak test. Referring again to the example given above, the timer GLT 2 can be preset for a test lasting three minutes, for the tire of the example.

On being energized, the gas leak test timer switch GLT-2a in line E, completes contact with the gas cutoff solenoid SVG-1 which operates to shift the spool of the valve SVG admitting operating air pressure to close the test valve 30 thereby isolating the cavity and chamber during the preset test time. In line F, the contacts of the pressure switch PS-51 will be closed only if the total pressure within the chamber and the cavity to which PS-51 is connected decreases from the initial pressure within the cavity to the lower pressure preset in the pressure switch PS-51. If the maximum tolerable leakage rate of pressure from the cavity has been determined to be, for example, a rate of 10 psi/minute, the timer GLT-2 is set for 3 minutes, the pressure switch PS-51 will have been set to close its electrical contacts at 30 psi. less than the initial pressure of, for example, 300 psi. or 270 psi. which is then the predetermined lower pressure at which a leakage signal will be given. Thus, if the leakage rate is less than the predetermined tolerable maximum, which in the present example is less than 10 psi/minute, pressure switch PS-51 remains open and no action occurs. This corresponds to the previously described third mode in accordance with the invention. On the other hand, in the event the leakage is found to exceed that tolerable maximum rate of pressure decrease, electrical contact is made by the pressure switch PS-51 and the gas leak relay GL, line F, is latched, and one of its contacts, GL-a (line N), closes to prevent entry of a next tire into the mold.

If the preset test time, for example, 3 minutes as set in the gas leak timer GLT 2, expires before the pressure switch PS-51 is closed, the switch GLT 2a, line E, disconnects the solenoid valve SVG-1 and makes connection with line G to energize the solenoid SVG-2 which admits pilot air from the supply line 28 to shift the spool of the solenoid valve SVG and reopen the test valve 30 restoring the press to normal operation. Restoration of the press to its normal operation at the expiration of the preset test time is a signal of the absence of harmful rates of leakage.

As will be seen in FIG. 2, should the relay SF have been latched at some time during the curing cycle, the relay contacts SF-c, FIG. 3, as discussed above, close to actuate relay R-1, line M, contacts R1-a of which, line O, are opened to deenergize the solenoid valve SV-1 so as to shut off air supply to air line 24 thereby closing the valve 22, as well as other valves controlling supply of fluid media to the press.

In a still further aspect of the invention, the relays SF and GL, when latched are prevented from being unlatched without attention by authorized persons. FIGS. 2 and 3 illustrate a power line L-1 which is energized while the main press control is energized to operate in any mode. To ensure the attention of such authorized persons, the key operated reset switch KS-2, operable only by a removable key, is connected, lines G, H, and I, to unlatch the relays SF and/or GL only in response to the switch KS-2, which operates simultaneously also to energize the solenoid valve SVG-2 to reopen the test valve 30.

As previously indicated herein, the latching of the relay GL operates to extend the cure time of a tire in process of being cured in the mold by making the contact GL-b in line J so as to energize the gas leak cure extend timer GLCE. The contacts GL-b also energize a gas leak warning light WGL in line L.

To extend the normal cure time of the tire being cured when a gas leak of the second mode as above described has been detected, the relay contacts GL-b close to actuate the gas leak cure extend timer GLCE, line J, which timer can be set to extend the normal cure time by an additional, empirically determined amount. Simultaneously with latching of the relay GL, relay contacts GL-e in line P, FIG. 3, are opened and the normally open, time closed switch GLCE-a holds open for the time preset in the timer GLCE. This deenergizes the main timer 27 for the preset cure extend time. When the timer GLCE times out, the switch GLCE-a is closed, reenergizing the timer 27 to complete the remainder of the cure cycle.

As will be observed by inspection of FIGS. 2 and 3, either the latching of the system failure relay SF or the latching of the gas leak relay GL operates to prevent the press loader from loading a next tire awaiting cure. The circuit 40 in such event can be reset for further operation only by operation of the key operated reset switch KS-2.

The invention contemplates application of the apparatus to presses having two or more tire molds in which case the apparatus heretofore described can be duplicated in its entirely or, as will now be evident to persons skilled in the art, assembled in accordance with the description of FIG. 1 but duplicating certain elements such as the solenoid valve and the pressure switches.

In the present specification, including the claims, inert gas will be understood to mean any gas compatible with and harmless to the tires and/or the press bladders which may be deployed into the tire cavity. In the practice of the invention, inert gas comprising deoxygenated compressed air from which other chemically active elements also have been removed has been found eminently satisfactory. Production and use of such inert gas is well known and is not within the scope of the present invention.

While certain representative embodiments and details have been shown for the purpose of illustrating the invention, it will be apparent to those skilled in the art that various changes and modifications may be made therein without departing from the spirit or scope of the invention.

We claim:

1. In apparatus for curing a tire having a cavity in a curing mold for a predetermined time and including first valve means for controlling admission of fluid medium at a first pressure to said cavity, the improvement comprising in combination second valve means for controlling said fluid medium between said first valve means and a supply of said gas, presettable timing means operable to effect closure of said second valve means for a preset time during and less than said predetermined time, fluid pressure responsive means operable to sense a second pressure less than said first pressure in said cavity, circuit relay means connected to said timing means and to said pressure responsive means and operable to generate a first signal responsive to an occurrence of said second pressure during said preset time, and a second timing means connected to said circuit relay means and energized in response to said first signal to extend said predetermined time.

2. The apparatus of claim 1, including contact means connected with said relay means to operate in response to said first signal to prevent loading a tire into said mold.

3. The apparatus of claim 1, wherein said apparatus includes air pressure actuated valve operating means for positioning said first valve means, and including second pressure responsive means in pressure communication with said air pressure actuated valve operating means and operable in response to air pressure increase therein to energize said presettable timing means.

4. The apparatus of claim 1, including third pressure responsive means in pressure communicating relation with said cavity and operable to sense a third pressure less than said second pressure in said cavity and to energize said relay means independently of said preset time period.

5. The apparatus of claim 1, said circuit relay means being operable in response to non-occurrence of said second pressure in said cavity during said preset time period to generate a second signal operable to open said second valve means.

6. The apparatus of claim 1, said circuit relay means including at least one latching relay, and further including key-operated reset means operable only by a removable key to unlatch said latching relay.

\* \* \* \* \*